A. S. HALLIDIE.

TRAMWAY FOR CURVES AND CABLE GRIPS.

No. 10,681. Reissued Feb. 2, 1886.

Attest:
Walter Douglass
F. L. Middleton

Inventor
Andrew S. Hallidie
by Ellis Spear
Att'y.

UNITED STATES PATENT OFFICE.

ANDREW S. HALLIDIE, OF SAN FRANCISCO, CALIFORNIA.

TRAMWAY FOR CURVES AND CABLE-GRIPS.

SPECIFICATION forming part of Reissued Letters Patent No. 10,681, dated February 2, 1886.

Original No. 330,976, dated November 24, 1885. Application for reissue filed January 7, 1886. Serial No. 187,831. Patented in England December 13, 1879, No. 5,107; in Victoria July 10, 1880, No. 2,863; in New South Wales October 19, 1880, No. 880; in Queensland November 12, 1880, No. 323; in New Zealand November 19, 1880; in Belgium December 5, 1882, No. 59,750; in Italy December 27, 1882, No. 14,903; in Portugal January 25, 1883, No. 812, and in Spain June 8, 1883, No. 4,079.

*To all whom it may concern:*

Be it known that I, ANDREW S. HALLIDIE, of the city and county of San Francisco, State of California, have invented an Improvement in Tramways for Curves and Cable-Grips; and I hereby declare the following to be a full, clear, and exact description thereof.

My invention relates to certain improvements in wire rope or cable tramways in which cars are propelled by means of a grip attached permanently to each car, and so constructed that it may be made to hold or let go of the cable at will.

My invention consists in the combination, with the main curve of the track and slot, of the guide-rail beneath and the cable-carrying sheaves for carrying the cable around the curves, and a grip, as set forth.

Figure 1:
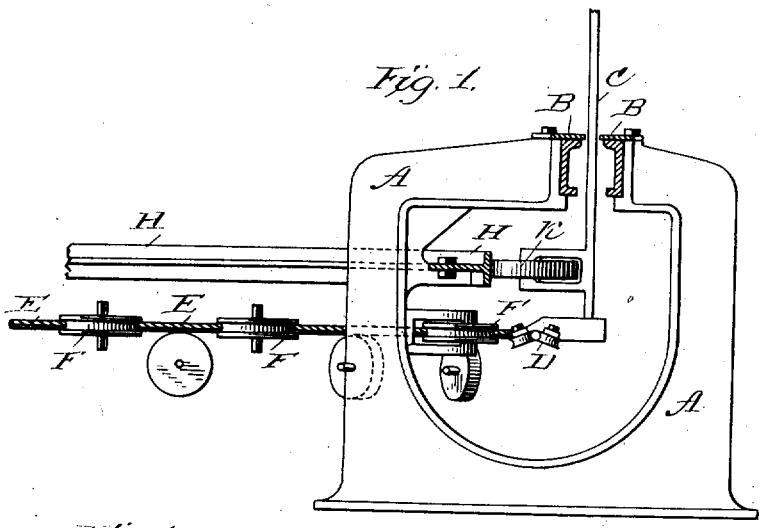
Figure 2:
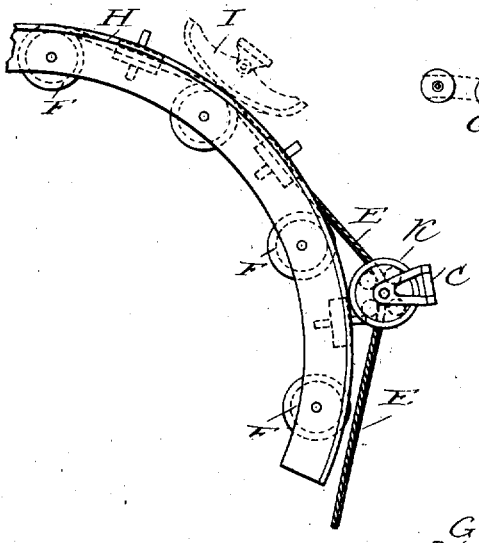
Figure 4:
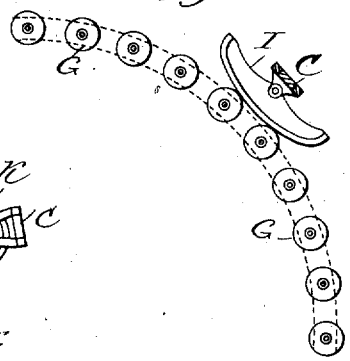
Figure 3:
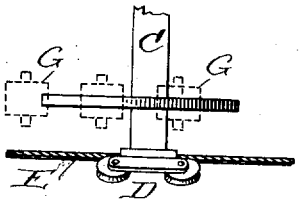

Referring to the accompanying drawings for a more complete explanation of my invention, Figure 1 is a transverse section of part of a cable tube or tunnel with the slot gripper-shank and a form of grip, horizontal sheaves around which the cable passes, and by which it is supported around the curve, a curved supporting bar or guide parallel with the slot, and a horizontal wheel or roller fixed to the grip so as to travel upon the guide. Fig. 2 is a plan of the parts shown in Fig. 1, except the tube. Fig. 3 is a vertical section taken in the line of travel of the rope, and showing a shoe in place of the rollers upon the grip, and a series of guide-rollers, over which it travels in place of the guide-bar. Fig. 4 is a plan view of the parts shown in Fig. 3.

In the present case A, Fig. 1, is a yoke, such as is employed to give form to the cable tube or tunnel and support to its longitudinal sides.

B B are the longitudinal slot-irons, parallel with the rails upon which the car travels, and having a narrow slot between them, through which the shank C of the cable-gripper passes from the car into the tube.

D is a form of grip which is operated from within the car, so as to engage or disengage from the cable E, these parts not differing essentially from those already in use.

In order to support the cable and carry it freely around curves wherever it is necessary to change direction, I fix a series of horizontal sheaves, F, in suitable supports along the tube upon the inner side of the curve and at such short distances apart that the cable travels in a line which is practically parallel with the curved line of the slot.

The gripper is supported against the tendency of the cable to draw it toward the inside as it passes around the curve, either by a series of horizontal rollers, G, Figs. 3 and 4, placed near together and just above the line of the cable, or by a smooth guide-rail, H, Figs. 1 and 2, which is supported from the inner side of the curve in a similar position.

When the rollers are employed, I fix a curved shoe, I, to the grip-frame by a pin or bolt, so that it may have some motion about its point of support, and this shoe is of sufficient length to ride around the curve upon the rollers, thus supporting the grip against the side strain of the cable, which will be considerable, when it is temporarily lifted away from its supporting sheaves F by the grip as it passes.

If the guide-rail H is used, a roller or rollers, K, may be fixed to the grip-frame, and this will travel around the curve upon the rail H.

As the slot through which the grip-shank passes into the tube is narrow, it is necessary to keep the shank as nearly central as possible and prevent side wear, and this is effected by the rollers or shoe.

In practice I prefer to employ a shoe which will travel upon the smooth guide-rail, as this will produce a smoother and more even movement.

Having thus described my invention, what I claim as new, and desire to secure by Letters Patent, is—

In a cable railway, the main curve of the track and slot, in combination with the guide-rail beneath and the cable-carrying sheaves for carrying the cable around the curves, and a grip, as set forth.

In witness whereof I have hereunto set my hand.

ANDREW S. HALLIDIE.

Witnesses:

S. H. NOURSE,

H. C. LEE.